United States Patent
Anbarani

(10) Patent No.: US 7,301,907 B2
(45) Date of Patent: Nov. 27, 2007

(54) METHOD OF CONTROLLING PACKET FLOW

(75) Inventor: Hossein Arefi Anbarani, Bethesda, MD (US)

(73) Assignee: Telefonktiebolaget LM Ericsson (publ), Stockholm (SE)

(*) Notice: Subject to any disclaimer, the term of this patent is extended or adjusted under 35 U.S.C. 154(b) by 549 days.

(21) Appl. No.: 11/030,250

(22) Filed: Jan. 6, 2005

(65) Prior Publication Data

US 2006/0146711 A1  Jul. 6, 2006

(51) Int. Cl.
H04J 1/16 (2006.01)
H04J 3/14 (2006.01)

(52) U.S. Cl. .................................. 370/235; 370/229

(58) Field of Classification Search ........... 370/229, 370/230, 230.1, 235, 236, 235.1
See application file for complete search history.

(56) References Cited

U.S. PATENT DOCUMENTS

| 6,175,554 | B1 | 1/2001 | Jang et al. | |
|---|---|---|---|---|
| 7,177,279 | B2* | 2/2007 | Kataria | 370/235 |
| 2002/0176361 | A1 | 11/2002 | Wu et al. | |
| 2005/0185587 | A1* | 8/2005 | Klinker | 370/237 |
| 2006/0146729 | A1* | 7/2006 | Krautkremer et al. | 370/252 |
| 2006/0159019 | A1* | 7/2006 | Buskirk et al. | 370/235 |

FOREIGN PATENT DOCUMENTS

WO WO 01/05107 A  1/2001

OTHER PUBLICATIONS

Wu-Chang Feng, et al.; BLUE: A New Class of Active Queue Management Algorithms; University of Michigan Technical Report CSE-TR387-99, 1999.
Teunis J. Ott, et al.; SRED: Stabilized RED; Proc. INFOCOM 1999, Mar. 1999.
Bob Braden, et al,; Recommendations on Queue Management and Congestion Avoidance in the Internet; Internet RFC 2309, Apr. 1998.
Dong Lin, et al.; Dynamics of Random Early Detection; Proc. SIGCOMM 97, 1997.
Sally Floyd, et al.; Random Early Detection Gateways for Congestion Avoidance; IEEE/ACM Trans. Networking, vol. 1, No. 4, Aug. 1993, pp. 397-413.

* cited by examiner

Primary Examiner—Ajit Patel
(74) Attorney, Agent, or Firm—Michael Cameron

(57) ABSTRACT

A method of controlling packet flow through a network node in a packet-switched communication network. At least three measurements of instantaneous queue size are obtaining and utilized to determine a traffic pattern's relative shape, absolute level, and absolute context over a more extended time period. An initial estimate of a future level of congestion is made from the shape, level, and context of the traffic pattern, and is then utilized to establish initial settings for traffic control parameters. An auto-tuning process further optimizes the settings by periodically re-determining the shape, level, and context of the traffic pattern based on updated measurements of instantaneous queue size. Potential changes to the control parameters are tested at a dynamically determined interval, and are accepted only if the changes result in improvements in network performance.

18 Claims, 4 Drawing Sheets

| Context Level Shape | Light | | | | Moderate | | | | Heavy | | | |
|---|---|---|---|---|---|---|---|---|---|---|---|---|
| | Empty | Low | Med. | High | Empty | Low | Med. | High | Empty | Low | Med. | High |
| Flat | 0 | 0 | 0 | 0.1 | 0 | 0 | 0 | 0.1 | 0 | 0 | 0.2 | 0.5 |
| Ascending | 0 | 0 | 0.1 | 0.2 | 0 | 0.1 | 0.2 | 0.4 | 0 | 0.1 | 0.4 | 0.8 |
| Descending | 0 | 0 | 0 | 0 | 0 | 0 | 0 | 0.1 | 0 | 0 | 0.1 | 0.3 |
| Top | 0 | 0 | 0 | 0.1 | 0 | 0 | 0 | 0.2 | 0 | 0 | 0.2 | 0.4 |
| Bottom | 0 | 0 | 0.1 | 0.2 | 0 | 0 | 0.1 | 0.3 | 0.1 | 0.2 | 0.3 | 0.7 |

METHOD OF CONTROLLING PACKET FLOW

BACKGROUND

The present invention relates to communication networks. In particular, and not by way of limitation, the present invention is directed to a method of controlling packet flow in a packet-switched communication network.

Buffers exist in network devices to absorb traffic bursts. When the input traffic flow to the device is larger than the output flow, a queue builds up in the buffer. When the input flow is smaller than the output flow, the queue drains. Therefore, the device can handle a variable input load that is larger than the device's output capacity for short periods of time. However, if the load mismatch lasts too long, the queue fills up and a passive manager starts dropping arriving packets that do not fit in the queue. This behavior is called "tail-drop" and it has some major problems associated with it.

A first major problem with tail-drop is related to the way the Transmission Control Protocol (TCP) handles congestion avoidance. When experiencing a packet loss, TCP reduces its congestion window size, thus reducing the packet transmission rate. Once packet transmissions are acknowledged, TCP increases the transmission rate again. During congestion, tail-drop drops packets from multiple TCP flows, thereby causing multiple TCP flows to reduce their transmission rates at the same time. Once tail-drop stops, the multiple TCP flows receive acknowledgments for their packet transmissions and increase their transmission rates at the same time. This phenomenon is called "TCP Global Synchronization" and results in bursty, "on-off" traffic that alternately causes congestion or network under utilization.

Another major problem associated with tail-drop is queuing delay. Under some conditions, queues get full or nearly full and stay that way for some time. This results in all packets experiencing a large delay, even if the traffic input rate does not exceed the output rate. Thus, waiting until a queue is full before dropping packets contributes negatively to queuing delay.

Tail drop also contributes to unfairness in the network. Passive queues result in bursty, high-bandwidth-consuming traffic. Such traffic is allowed to fill up the queue and once the queue is full, all incoming traffic is punished equally. This is especially harmful to smooth, low-bandwidth traffic that would otherwise not experience any packet loss.

More packets are dropped if the queue is full or nearly full because the size of available buffering to absorb traffic bursts is smaller. Most dropped packets have to be retransmitted, thereby reducing the throughput of useful traffic or "goodput" of the network. During tail-drop, a single flow may encounter multiple sequential packet losses. The TCP algorithm does not recover well from such losses. Also TCP global synchronization can lead to buffer underflow and reduced goodput and throughput in general.

Active Queue Management (AQM) is a mechanism that tries to address these problems by actively managing the queues, which usually means dropping packets before the queue is full. The challenge for AQM lies in choosing which packets to drop, how many packets to drop, and at what time. Random Early Detection (RED) is one of the most commonly deployed and researched AQM algorithms, and is recommended by the Internet Engineering Task Force (IETF) in RFC2309. The RED algorithm calculates an average queue size using an Exponential Weighted Moving Average (EWMA) low-pass filter. The average queue size is compared to a minimum and a maximum threshold. If the average queue size is less than the minimum, no packets are dropped; if the average queue size is more than the maximum, all packets are dropped; if the average queue size is in the range between the minimum and the maximum, packets are dropped randomly according to a drop probability. The drop probability calculation is a function of the average queue size. The drop probability grows from zero to a maximum limit and is directly proportional to the average queue size.

There have been a number of other AQM algorithms suggested, such as Flow RED (FRED), BLUE, and Stabilized RED (SRED). In general, all AQM algorithms view the network as a closed-loop system and try to implement a closed-loop regulator to control the traffic load and reduce congestion. Such a system uses "monitors" or "sensors" to obtain information about specific conditions in the system. These signals are either used as is, or they are "smoothed out" or "conditioned" to remove unwanted noise from the useful information. For sake of simplicity, "monitor" is used herein to refer to these signals, either conditioned or not. The monitors are used as input to a model, which can be ether explicit or implicit. An explicit model supplied with the monitored inputs could, at least theoretically, produce a simulated estimation of future network conditions. This estimation feeds into a controller that applies congestion avoidance (e.g., dropped packets), according to some algorithm or "control law" if the estimation indicates congestion in the future. In an implicit model, the monitors may feed directly into the controller, in which case the model is implicit in the control law itself.

There are several major problems with this approach. First, the monitors, either used as they are or smoothed, do not clearly and consistently distinguish between congestion buildup in the network that needs to be controlled or a transient traffic burst that should be left alone. Second, an accurate explicit model of Internet traffic does not exist today, and the implicit models in the control law are not good enough to estimate potential congestion buildup in the future, given the complex nature of Internet traffic patterns.

Third, the controllers have an objective of estimating congestion, but they have neither the objective nor the means to measure sub-optimal network utilization. Although the existence of congestion, or lack of it, serves as a feedback to the controller regarding the question of whether enough control is being applied (i.e., whether enough packets are being dropped), there is no feedback to the controller regarding the question of whether too much control is being applied (i.e., too many packets are being dropped) resulting in under utilization of the network. Finally, the task of choosing optimal algorithm parameter values is left to network administrators who, in turn, usually use a recommended default value. The problem is that different networks need different settings, and the same default value does not fit all networks. Furthermore, network conditions and topology tend to change over time, so even if the original settings were optimal, they may not be later on.

SUMMARY

In one aspect, the present invention is directed to a method of controlling packet flow through a network node in a packet-switched communication network. The node includes a buffer in which a queue of packets is formed. The size of the queue increases when an input transmission rate is greater than an output transmission rate, and the size of the queue decreases when the input transmission rate is less than the output transmission rate. Incoming packets are dropped if the buffer becomes full. The method includes the steps of obtaining at least three measurements of instantaneous queue size; determining a shape of a traffic pattern from the relative queue sizes obtained in the measurements; determining a level of the traffic pattern from the absolute queue size obtained in a selected measurement; and determining a context of the traffic pattern from the absolute queue size obtained in a plurality of measurements over a predefined time period. An initial estimate of a future level of congestion is then made based on the shape, level, and context of the traffic pattern. The method then establishes initial settings for traffic control parameters based on the initial estimate of the future level of congestion.

The method may also include an auto-tuning process in which the settings of the traffic control parameters are further optimized. The auto-tuning process includes periodically re-determining the shape, level, and context of the traffic pattern based on updated measurements of instantaneous queue size; making subsequent estimates of the future level of congestion based on the re-determined shape, level, and context of the traffic pattern; and establishing subsequent settings for the traffic control parameters based on the subsequent estimates of the future level of congestion. Changes to the control parameters may be tested, and are accepted only if the changes result in improvements in network performance.

DETAILED DESCRIPTION

The present invention utilizes a pattern recognition technique in which measurements of the instantaneous queue size are used as a monitor of network traffic. A few samples taken at different time intervals are stored in a database. At each new sampling instant, the latest sample together with the previously stored ones, form the shape of the traffic patterns. The latest value indicates the current traffic level, and a smoothed average value of the queue size over a longer period of time provides the context of the pattern. Together the shape, the level, and the context form a 3-dimensional pattern-matrix, with each element in the matrix constituting a different traffic pattern.

Figure 1:
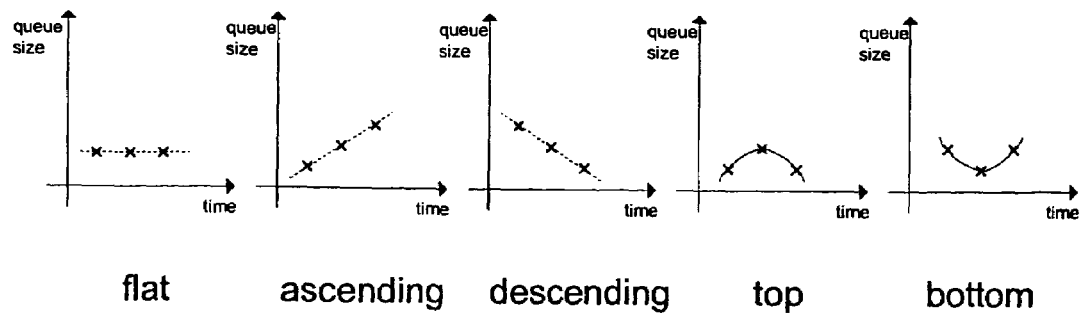
FIG. 1 illustrates several exemplary graphs of possible traffic pattern shapes.

FIG. 1 illustrates several exemplary graphs of possible traffic pattern shapes. The illustrated shapes are flat, ascending, descending, top, and bottom. In the graphs, three samples of the instantaneous queue size are used to form each shape, although a greater number of samples may be utilized. The invention then compares actual samples against the illustrated shapes to find the closest match. The two differential values resulting from the three samples from the current time window are compared to the value defining each shape. A numeric value is calculated to represent the degree of correlation in the comparison. The shape that yields the highest degree of correlation is the closest match.

The unit of the differential values defining each shape can be the number of packets, bytes, or a fraction of the maximum queue size. Using bytes or numbers of packets results in a less computationally intensive implementation. Using fractions of queue sizes is an option when there are many queues managed by the AQM function, and the maximum queue size is a variable.

The following example will clarify the process. Assume that the unit of the differential values defining each shape is "fraction of maximum queue size". Assume then that the five shapes are defined as: Flat (0,0), ascending (0.1, 0.1), descending (−0.1, −0.1), top (0.1, −0.1), and bottom (−0.1, 0.1). Now assume at a sampling interval, the latest three samples expressed in fractions of the maximum queue size are measured as 0.52, 0.65 and 0.59 resulting in the differential values (0.13, −0.6). The correlation with each shape may be calculated as the inverse of the absolute value of the difference between the first differential values plus the absolute value of the difference between the second differential values. This results in $1/(|0.13-0|+|(-0.6-0)|)=1/0.19=5.3$ for the "Flat" shape. Calculated similarly for all the shapes:

| | |
|---|---|
| Flat: | 5.3 |
| Ascending: | 5.3 |
| Descending: | 3.7 |
| Top: | 14.3 |
| Bottom: | 2.6 |

The shape with the highest amount of correlation, or the match, is thus "Top". To simplify the calculation in an implementation, the inversion can of course be left out, and the lowest total difference would then be interpreted as the highest correlation.

The second pattern recognition feature, the level of the pattern, may be determined by the range in which the instantaneous queue size (e.g., the value of the latest sample) falls.

Figure 2:
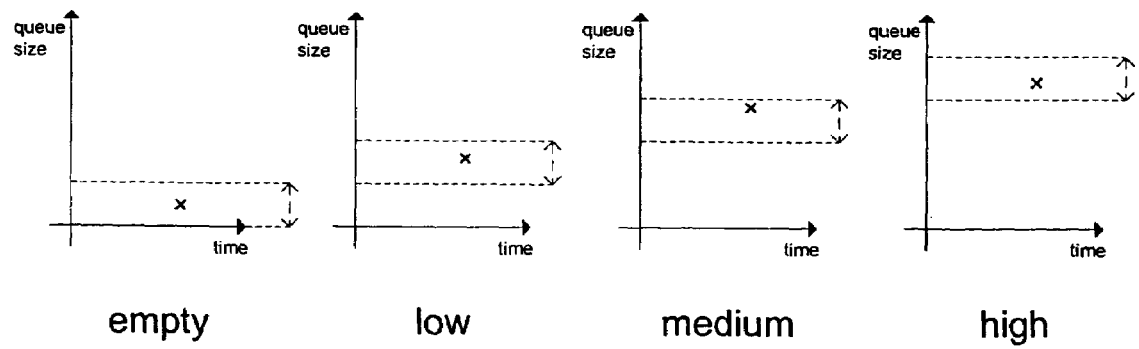
FIG. 2 shows the queue size divided into four exemplary levels.

FIG. 2 shows the queue size divided into four exemplary levels: empty, low, medium, and high. Each level is defined as a range with a lower and an upper limit. The unit of the limits may be number of packets, bytes, or a fraction of the maximum queue size. Using bytes or numbers of packets will result in a less computationally intensive implementation. Using fractions of queue sizes is an option when there are many queues managed by the AQM function and the maximum queue size is a variable.

The third pattern recognition feature, the context of the pattern, is a broader picture of the traffic pattern, or a history of the traffic extending a few time windows back from the current one. An EWMA value may be used as an indicator to gauge the general traffic load leading up to the time in which the current shape and level of the traffic are determined.

Figures 3, 4:
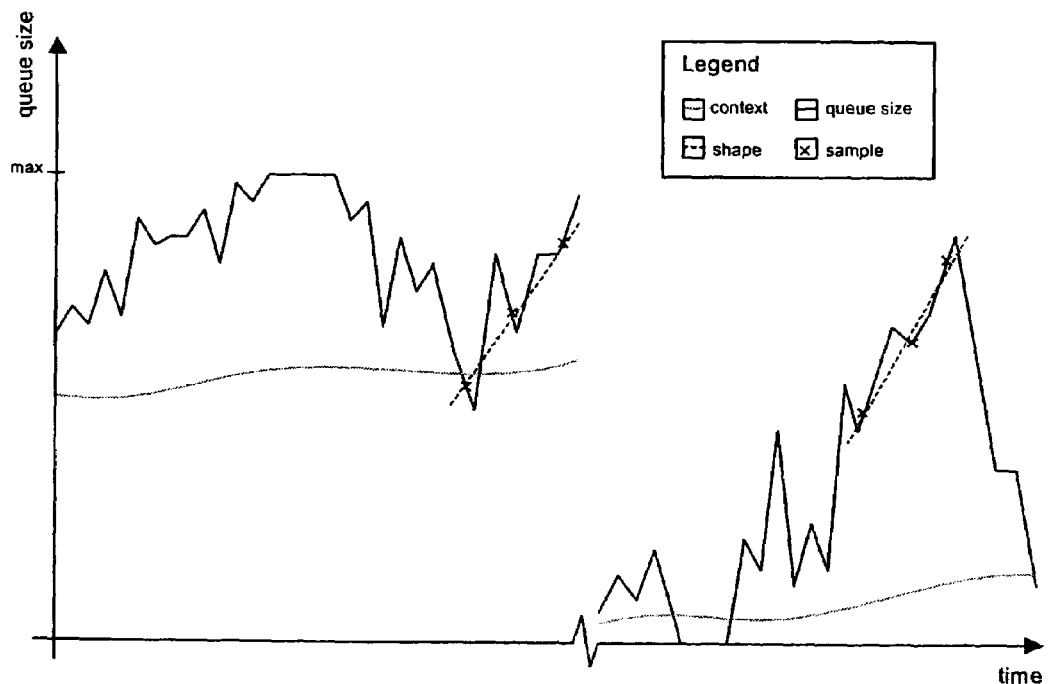
FIG. 3 is a graph of queue size samples showing two different traffic scenarios in which the three illustrated traffic samples result in the same shape and level values, but with different contexts.
FIG. 4 is a table illustrating an exemplary configuration of an initial control strategy.

FIG. 3 is a graph of queue size samples showing two different traffic scenarios in which the three illustrated traffic samples result in the same shape and level values, but with different contexts. Note that the three illustrated samples for each pattern form an ascending shape, and the final sample in each pattern is at the same level. The context value adds another dimension for differentiating between the two traffic patterns. Like the level value, each context is defined as a range with a lower and an upper limit. For example, the context values may be designated as light, moderate, and heavy with appropriate lower and upper limits. The unit of the limits may be number of packets, bytes, or a fraction of the maximum queue size. Using bytes or numbers of packets will result in a less computationally intensive implementation. Using fractions of queue sizes is an option when there are many queues managed by the AQM function and the maximum queue size is a variable.

Using the same number of shapes, level ranges, and context ranges as discussed above would result in a pattern matrix with 5×4×3=60 elements, a 2-dimensional array with each element representing a traffic pattern. After each sample, the latest 3 sample values yield the shape; the latest sample value yields the current level; and the EWMA value is updated to yield the current context. The resulting (shape, level, context) vector matches one and only one element in the traffic pattern matrix, thus completing the pattern matching.

The present invention then makes an initial estimate of a future level of congestion based on the determined shape, level, and context of the traffic pattern. From the initial estimate of the future level of congestion, the invention establishes initial settings for traffic control parameters. Thereafter, the invention may periodically auto-tune the traffic control parameters. It may be desirable to use auto-tuning for several reasons. First, it is difficult for a Network Administrator to tune the control parameters for each traffic pattern and achieve optimal settings for each of them. If default values are used instead, the resulting control behavior is bound to be even more sub-optimal. Auto-tuning alleviates this problem. Second, network conditions may change over time. It is not desirable and often not feasible to reconfigure the control parameters for an AQM algorithm every time network conditions change. With auto-tuning, reconfiguration is initiated and performed automatically.

The general components of the Auto-tuning process are (1) start with a good initial control strategy; (2) change a control parameter from time to time and test it to see if the "mutant" parameter provides an improvement; if not, change the parameter back to the previous value; (3) utilize a "quality" metric to determine whether the potential new control parameter (the mutant) is accepted or rejected; and (4) utilize a "stability" metric to determine the time interval between changing of control parameters, or "mutations".

For the initial control strategy, a reasonable starting point enables the auto-tuning algorithm to converge to the optimal values. This starting point is a control strategy that assumes an amount of expected future congestion, or lack thereof, for each traffic pattern in the matrix. A value is assigned to the control parameters to avoid the implicitly estimated future congestion or to prevent the application of control in order to maximize network utilization when no congestion is expected in the future. Note that this initial control strategy can be used as the control law for congestion pattern recognition without the auto-tuning process. If the auto-tuning process is deemed too costly, the congestion pattern recognition can function without it if a careful control strategy is crafted. In that case, the congestion estimation part will still be very powerful, but the corrective action may be sub-optimal.

FIG. 4 is a table illustrating an exemplary configuration of the initial control strategy. A drop decision at each packet arrival is made randomly according to the drop probability value of the current traffic pattern. Additionally, a minimum threshold value may be globally set for all the traffic patterns, or may be configured for each traffic pattern and optimized along with the drop probability variable by the auto-tuning function.

The quality metric enables the auto-tuning process to achieve the multiple objectives of minimum packet loss, low network delay, and high network utilization. The quality metric identifies indicators that dynamically measure the level of achievement of these goals. Since there are three different objectives to achieve, there are three indicators that, when combined, yield the overall quality value. The indicator for packet loss is directly related to the number of dropped packets during a time interval after a mutation is made. The packet-loss indicator may be a value in the range [0-1], and may be calculated as:

loss=Max (1, #dropped packets/Maximum Drop Constant).

Queue size may be used as an indicator for network delay because the larger the queue size, the longer an arriving packet has to wait before it is transmitted. Although the EWMA value can be used for the network-delay indicator, the preferred approach is to use an average value over a time period after a mutation is made. The average value may be a value in the range [0-1], and may be calculated as:

delay=Max(1, average queue size/Maximum Size Constant).

The network utilization indicator is selected to measure low network utilization that is caused by the AQM function. It is important to remember that low network utilization is not necessarily caused by the AQM control mechanism; there may be periods of low traffic load in the network that are totally unrelated to the AQM function. The network utilization indicator is determined using these steps:

(1) If drop probability is >0 for a traffic pattern (i.e., if AQM control is active, we want to find out of it is over-controlling), start a timer and clear the "queue empty" flag for this pattern.

(2) At timer expiration, determine whether the queue empty flag is set; if so, set the network utilization quality indicator, "utilization", to 1, otherwise set the indicator to 0.

The "queue empty" flag is a flag that is set every time the instantaneous queue size is zero. If the control mechanism decides that there is a congestion situation that warrants dropping of packets, the packet dropping should not be so excessive that the traffic load is zero soon afterwards.

The quality metric is determined by combining the packet loss indicator, the network-delay indicator, and the network utilization indicator. If equal weight is assigned to each metric, the quality metric value can be expressed as:

Quality=⅓ loss+⅓ delay+⅓ utilization

Lower values of the quality metric indicate better quality of the control mechanism. So when a mutation is made, the resulting quality is calculated after a time interval and compared to the old quality value. If the new value is lower, the old control parameter is replaced with the new one.

The stability metric is used to dynamically change the time interval between mutations. This interval may be set to a fixed value, and auto-tuning would function well enough without the stability metric. However, in order to decide the value of the time interval, a compromise would have to be made between a short interval to speed up the optimization process and a long interval to keep the network traffic disruption small. The range of the stability metric should be chosen in a range between a minimum and a maximum desired time interval between mutations. The initial value should be the minimum value, and every time a mutation is accepted, the stability value should be reset to that minimum. Every time a mutation is rejected, the stability value is doubled until it reaches the defined maximum.

Figure 5A:
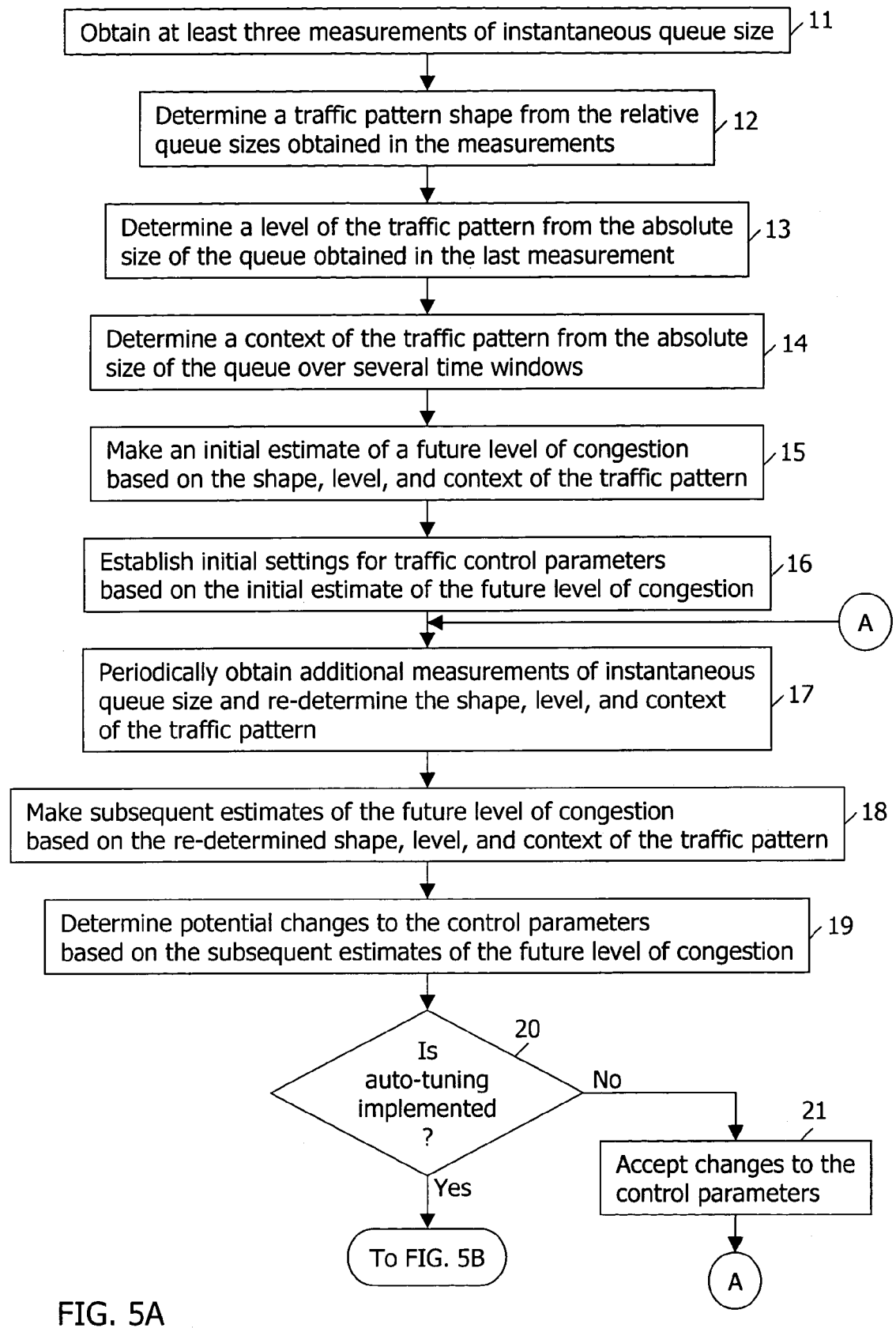
FIGS. 5A-5B are portions of a flow chart summarizing an embodiment of the method of the present invention.
Figure 5B:
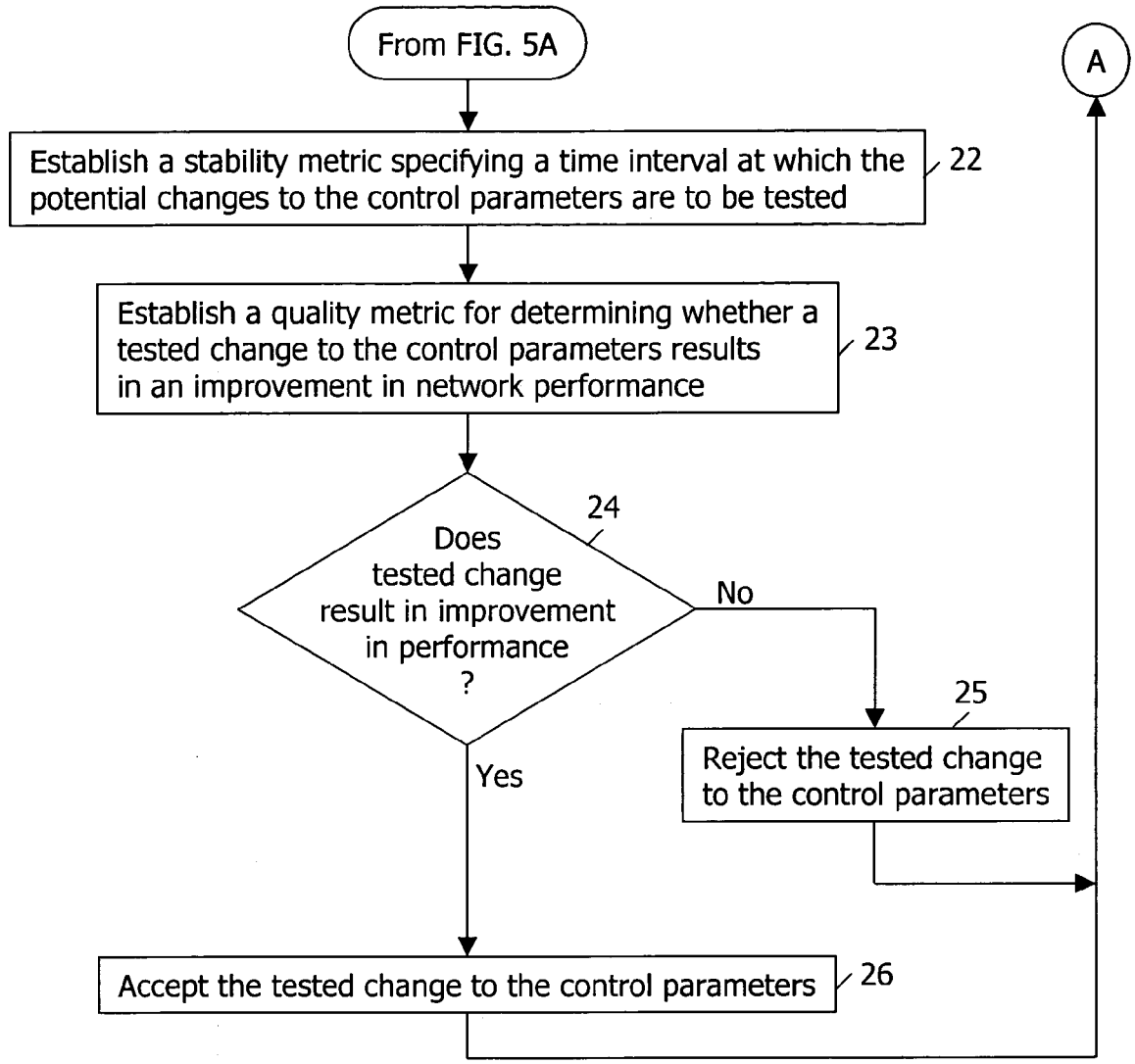

FIGS. 5A-5B are portions of a flow chart summarizing an embodiment of the method of the present invention. At step 11, at least three measurements of instantaneous queue size are obtained. At step 12, the shape of the traffic pattern is determined from the relative queue sizes obtained in the measurements. As noted above, the traffic pattern shape may be, for example, flat, ascending, descending, top, or bottom. At step 13, the absolute size of the queue obtained in a selected measurement, such as the last measurement, is used to determine a level of the traffic pattern. At step 14, a context of the traffic pattern is determined from the absolute size of the queue obtained in a plurality of measurements over a predefined time period such as several time windows. At step 15, the method makes an initial estimate of a future level of congestion based on the shape, level, and context of the traffic pattern. At step 16, initial settings for traffic control parameters are established based on the initial estimate of the future level of congestion.

At step 17, the method then begins the process of auto-tuning the traffic control parameters by periodically obtaining additional measurements of instantaneous queue size, and re-determining the shape, level, and context of the traffic pattern. At step 18, the method makes subsequent estimates of the future level of congestion based on the re-determined shape, level, and context of the traffic pattern. At step 19, the method determines potential changes to the control parameters based on the subsequent estimates of the future level of congestion. At step 20, it is determined whether the optional Auto-tuning process is implemented. If not, the method moves to step 21 where the determined changes to the control parameters are accepted. However, if Auto-tuning is implemented, the method moves instead to FIG. 5B.

Referring to FIG. 5B, at step 22, a time interval is established at which the potential changes to the control parameters are to be tested. At step 23, the method establishes a quality metric for determining whether a tested change to the control parameters results in an improvement in network performance. At step 24, it is determined whether the tested change results in an improvement in network performance. If not, the method moves to step 25 where the tested change to the control parameters is rejected. The method then returns to step 17 of FIG. 5A, where the process of auto-tuning the traffic control parameters continues. If it is determined at step 24 that the tested change results in an improvement in network performance, the tested change to the control parameters is accepted at step 26. The method then returns to step 17 of FIG. 5A, where the process of auto-tuning the traffic control parameters continues.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of controlling packet flow through a network node in a packet-switched communication network, said node having a buffer in which a queue of packets is formed, wherein the size of the queue increases when an input transmission rate is greater than an output transmission rate, the size of the queue decreases when the input transmission rate is less than the output transmission rate, and incoming packets are dropped if the buffer becomes full, said method comprising:

obtaining at least three measurements of instantaneous queue size;

determining from the relative sizes of the queue obtained in the measurements, a shape of a traffic pattern;

determining from the absolute size of the queue obtained in a selected measurement, a level of the traffic pattern;

determining from the absolute size of the queue obtained in a plurality of measurements over a predefined time period, a context of the traffic pattern;

making an initial estimate of a future level of congestion based on the shape, level, and context of the traffic pattern; and establishing initial settings for traffic control parameters based on the initial estimate of the future level of congestion.

2. The method of claim 1, wherein the step of determining the shape of the traffic pattern includes determining, from the relative sizes of the queue obtained in the measurements, a shape from a group consisting of flat, ascending, descending, top, and bottom.

3. The method of claim 1, wherein the step of determining the shape of the traffic pattern includes the steps of:

comparing the measurements of instantaneous queue size with a plurality of sets of stored queue sizes, wherein each set of stored queue sizes includes at least three queue sizes that, when compared relative to each other, form a different associated traffic pattern shape;

calculating a degree of correlation between the measurements of instantaneous queue size and each set of stored queue sizes; and selecting the traffic pattern shape associated with the set of stored queue sizes having the highest degree of correlation with the measurements of instantaneous queue size.

4. The method of claim 3, wherein differences in the values of the measurements and in the values of the stored queue sizes are recorded using units selected from a group consisting of number of packets, bytes, or a fraction of the maximum queue size.

5. The method of claim 4, wherein differences in the values of the measurements and in the values of the stored queue sizes are recorded using a fraction of the maximum queue size when there are a plurality of queues managed by a single management function, and the maximum queue size is a variable.

6. The method of claim 1, wherein the step of determining a level of the traffic pattern includes the steps of:

defining a plurality of levels, wherein each level has a different minimum and maximum absolute queue size; and comparing the absolute size of the queue obtained in the selected measurement with the different minimum and maximum absolute queue sizes defining the plurality of levels to determine the level of the traffic pattern.

7. The method of claim 6, wherein the selected measurement is the most recent measurement of instantaneous queue size.

8. The method of claim 1, wherein the step of determining a context of the traffic pattern includes:

accessing a history of queue size measurements extending back over the predefined time period;

calculating an Exponential Weighted Moving Average (EWMA) value of the queue size measurements over the predefined time period; and utilizing the EWMA value as the context of the traffic pattern.

9. The method of claim 1, further comprising auto-tuning the traffic control parameters, said auto-tuning step including:
periodically re-determining the shape, level, and context of the traffic pattern based on updated measurements of instantaneous queue size;
making subsequent estimates of the future level of congestion based on the re-determined shape, level, and context of the traffic pattern; and
establishing subsequent settings for the traffic control parameters based on the subsequent estimates of the future level of congestion.

10. The method of claim 9, wherein the step of establishing subsequent settings for the traffic control parameters includes the steps of:
determining potential changes to the control parameters based on the subsequent estimates of the future level of congestion;
establishing a time interval at which the potential changes to the control parameters are to be tested;
establishing a quality metric for determining whether a tested change to the control parameters results in an improvement in network performance;
accepting the tested change to the control parameters if the tested change results in an improvement in network performance; and
rejecting the tested change to the control parameters if the tested change does not result in an improvement in network performance.

11. The method of claim 10, wherein the step of establishing a time interval at which the potential changes to the control parameters are to be tested includes establishing the time interval between a minimum time interval and a maximum time interval, wherein the minimum time interval is selected to speed up the auto-tuning process, and the maximum time interval is selected to minimize network traffic disruption.

12. The method of claim 11, wherein the step of establishing the time interval between a minimum time interval and a maximum time interval includes the steps of:
initially setting the time interval at the minimum time interval;
each time a tested change is rejected, increasing the time interval until the maximum time interval is reached; and
each time a tested change is accepted, resetting the time interval to the minimum time interval.

13. The method of claim 10, wherein the step of establishing a quality metric includes combining a packet-loss indicator, a network-delay indicator, and a network utilization indicator.

14. The method of claim 13, wherein the packet-loss indicator is calculated as the number of packets dropped during the time interval that a potential change to the control parameters is tested, divided by a maximum drop constant.

15. The method of claim 13, wherein the network-delay indicator is calculated as the average queue size during the time interval that a potential change to the control parameters is tested, divided by a maximum size constant.

16. The method of claim 13, wherein the network utilization indicator determines whether the method is over-controlling the packet flow by determining whether the method is actively dropping packets at a rate that drops the instantaneous queue size to zero during a testing time period.

17. The method of claim 16, wherein the step of determining whether the method is actively dropping packets at a rate that drops the instantaneous queue size to zero during a testing time period includes the steps of:
clearing a queue empty flag at the beginning of the testing time period;
setting the queue empty flag if the instantaneous queue size is zero; and
determining at the end of the testing time period whether the queue empty flag is set.

18. A method of controlling packet flow through a network node in a packet-switched communication network, said node having a buffer in which a queue of packets is formed, wherein the size of the queue increases when an input transmission rate is greater than an output transmission rate, the size of the queue decreases when the input transmission rate is less than the output transmission rate, and incoming packets are dropped if the buffer becomes full, said method comprising:
obtaining at least three measurements of instantaneous queue size;
determining from the relative sizes of the queue obtained in the measurements, a shape of a traffic pattern selected from a group consisting of flat, ascending, descending, top, and bottom;
determining from the absolute size of the queue obtained in a selected measurement, a level of the traffic pattern;
determining from the absolute size of the queue obtained in a plurality of measurements over a predefined time period, a context of the traffic pattern;
making an initial estimate of a future level of congestion based on the shape, level, and context of the traffic pattern;
establishing initial settings for traffic control parameters based on the initial estimate of the future level of congestion;
periodically obtaining additional measurements of instantaneous queue size and re-determining the shape, level, and context of the traffic pattern;
making subsequent estimates of the future level of congestion based on the re-determined shape, level, and context of the traffic pattern;
determining potential changes to the control parameters based on the subsequent estimates of the future level of congestion;
establishing a time interval at which the potential changes to the control parameters are to be tested;
establishing a quality metric for determining whether a tested change to the control parameters results in an improvement in network performance;
accepting the tested change to the control parameters if the tested change results in an improvement in network performance; and
rejecting the tested change to the control parameters if the tested change does not result in an improvement in network performance.

* * * * *